Dec. 15, 1931.  A. G. A. CHAMBERLAIN  1,836,014
LADLE
Filed July 22, 1930
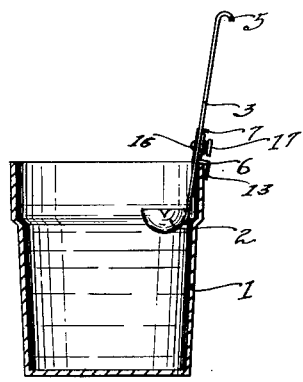
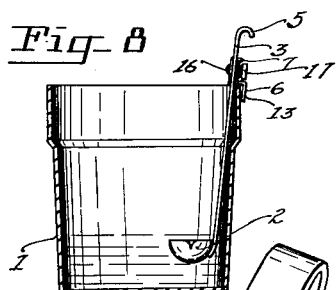
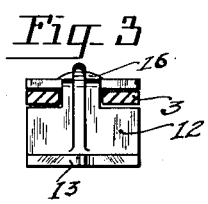
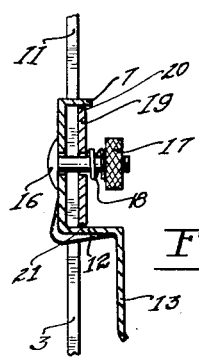
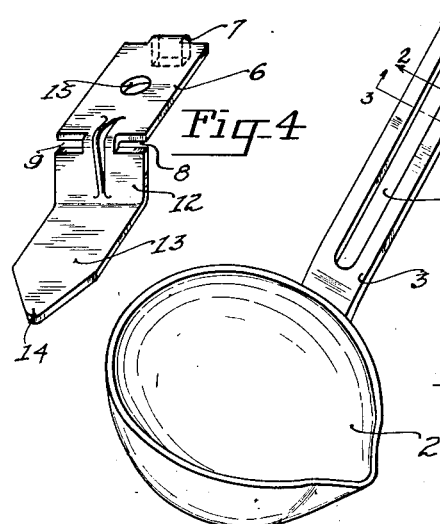
Artiemus G. A. Chamberlain
INVENTOR
BY
ATTORNEY Patented Dec. 15, 1931

1,836,014

UNITED STATES PATENT OFFICE

ARTIEMUS G. A. CHAMBERLAIN, OF PORTLAND, OREGON

LADLE

Application filed July 22, 1930. Serial No. 469,675.

My invention is primarily intended for use by cooks and chefs for the dishing of soups, broths and the like, the object of the device being to provide facilities for the maintaining of the ladle bowl at the approximate heighth of the surface level of the material to be served to thereby prevent the abnormal drip that occurs when the ladle is permitted to fall to the bottom of the receptacle, into which the same is to be placed.

By the providing of an adjustable handle for the ladle with a supporting hook associated therewith, the bowl of the ladle is adapted for being maintained at the surface level of the material into which the same is to be placed.

The object of my invention is to provide means to prevent an abnormal surface drip forming upon the ladle and the handle of the ladle that will normally deposit upon the plate, platter, bowl or dish, when the device is being used for the serving of the products therefrom.

While my invention is primarily intended for use by cooks, chefs, and the like, I do not wish to be limited in the application of my invention for such purposes as the same may be used with equal facility by telephone workers, by workers babbitting boxes in foundry practice and in any and all places where a liquid is to be served for any purpose from a bowl or receptacle into which the same is being maintained in a fluid form.

A further object of my invention consists in providing a simplified construction adapted for manipulation by one hand only and which may be used over relatively long periods with freedom from mechanical annoyances.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.
In the drawings:

Fig. 1 is a perspective, front view of the assembled device.

Fig. 2 is a fragmentary, sectional, side view taken on line 2—2 of Fig. 1, looking in the direction indicated.

Fig. 3 is a sectional, end view, of the handle portion of the device, the same being taken on line 3—3 of Fig. 1, looking in the direction indicated.

Fig. 4 is a perspective, end view, of the hook portion that is slidably disposed upon the handle.

Fig. 5 is a fragmentary, sectional, side view of the handle portion and the adjustable hook disposed thereupon.

Fig. 6 is an inverted plan view of the hook portion and of the handle upon which the same is slidably disposed, the same being taken on line 6—6 of Fig. 5, looking in the direction indicated.

Fig. 7 is a sectional, side view of a liquid holding receptacle illustrating one of my new and improved devices disposed upon the receptacle and illustrating the bowl of the ladle as being supported substantially at the surface of the liquid disposed within the receptacle.

Fig. 8 is a sectional, side view of the receptacle illustrating the ladle being disposed therein and being supported at a lower level than that illustrated in Fig. 7.

Like reference characters refer to like parts throughout the several views.

1 is a liquid holding receptacle, adapted for the maintaining of a liquid therein which is to be dispensed therefrom by a ladle 2. The ladle 2 is disposed upon the lower end of a handle 3. The handle 3 has a slot 4 disposed longitudinally of the handle and a supporting hook 5 terminates the upper end of the handle structure. An adjustable hook member 6 is slidably disposed upon the handle portion. A lip 7 is disposed at one end of the body portion of the adjustable hook that is adapted for placement within the slot 4 disposed longitudinally of the handle member.

Slits 8 and 9 are disposed upon opposite sides of the body portion of the adjustable hook adapted to having the sides 10 and 11 of the handle portion, that are disposed adjacent the slot 4, to be slidably positioned therein. An offset 12 is disposed within the body portion and a tongue 13 terminates the same. The offset 12 is preferably formed of substantially two right angle bends in order that the tongue portion 13 will lie substantially parallel with the handle portion of the adjustable hook supporting member. The tongue portion 13 may be pointed as illustrated at 14 to facilitate its placement upon the rim of the liquid holding device, upon which the same is to be placed.

A hole 15 is disposed through the body of the device, through which a threaded member 16 may be made to pass. The threaded member 16 has an adjusting nut 17 threadedly placed thereupon with a compressible element as a coil spring 18, disposed about the body of the adjustable threaded member. A friction plate 19 is disposed about the threaded member and which is made to engage upon the under side of the handle member.

I preferably form the friction plate 19, rectangular in plan area, in order that the end 20 of the friction plate may be made to engage upon the lip 7 and in order that the oppositely disposed end 21 may be made to engage upon the offset portion 12, to thereby maintain the friction plate in registerable alignment and in frictional engagement with the handle. The friction plate may be made as illustrated in Figs. 5 and 6 wherein the central portion of the friction plate is normally maintained in spaced relationship with the handle portion and wherein the end portions 22 and 23 are made to engage directly upon the handle portion. The same is held in position by a rivet 24, or by any other suitable means. The friction plate is preferably made of spring material to normally maintain a predetermined friction between the supporting hook and the handle upon which the same is positioned.

The device so made may be placed within the receptacle, and as the contents of the receptacle is dispensed, through the use of the ladle, the ladle may be made to follow the surface of the liquid, by pressing upon the handle to force the adjusting hook into position upward along the handle.

When the receptacle has a higher level therein, the adjusting hook may be forced along the handle to desired position by any suitable means as by hand positionment.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a ladle, a handle terminating the hooked terminal and secured to the ladle, a slot disposed longitudinally of the handle, an adjustable hook slidably disposed upon the handle, a lip formed at one end of the adjustable supporting hook adapted for placement within the slot disposed longitudinally of the handle, an offset disposed within the body portion of the adjustable hook with slits disposed within the oppositely disposed sides of the adjustable hook, said slits being adapted for receiving the portions of the handle therein that are disposed at either side of the longitudinal slot, and means for maintaining a frictional engagement between the adjustable hook and the handle portion of the ladle.

2. In a device of the class described, the combination with a ladle having its handle terminating in a supporting hook and having a slot disposed longitudinally and centrally of the handle, a hook having slits disposed at each side thereof slidably disposed upon the handle, said hook comprising a lip formed at one end thereof adapted to ride within the slot of the handle, a tongue portion disposed at the oppositely disposed end of the hook and in spaced relation with the handle, an opening disposed through the hook, and adjustable means disposed through the opening and the slot for maintaining a frictional engagement between the hook and the handle.

ARTIEMUS G. A. CHAMBERLAIN.